United States Patent
Huang et al.

(10) Patent No.: US 7,113,560 B1
(45) Date of Patent: Sep. 26, 2006

(54) SERIAL LINK SCHEME BASED ON DELAY LOCK LOOP

(75) Inventors: Mu-Jen Huang, Taipei (TW); Linhsiang Wei, Hsinchu (TW); Fu-Shing Ju, Keelung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 834 days.

(21) Appl. No.: 10/253,293

(22) Filed: Sep. 24, 2002

(51) Int. Cl.
*H04L 7/00* (2006.01)

(52) U.S. Cl. ............... 375/355; 375/326; 375/327; 375/360; 375/362; 375/371; 341/50; 341/59; 341/60; 341/61

(58) Field of Classification Search ............ 375/326, 375/327, 354, 355, 360, 362, 371; 341/50, 341/68–74, 126; 327/50, 58, 60, 91, 94
See application file for complete search history.

(56) References Cited

U.S. PATENT DOCUMENTS

| | | | |
|---|---|---|---|
| 4,949,360 A * | 8/1990 | Martin ................ 375/354 |
| 5,218,677 A | 6/1993 | Bono et al. ............ 395/275 |
| 6,107,946 A | 8/2000 | Jeong ................. 341/101 |
| 6,229,859 B1 | 5/2001 | Jeong et al. ........... 375/354 |
| 6,278,755 B1 * | 8/2001 | Baba et al. ............ 375/360 |
| 6,888,905 B1 * | 5/2005 | Cheah et al. .......... 375/355 |
| 6,914,947 B1 * | 7/2005 | Persson et al. ........ 375/340 |
| 7,010,074 B1 * | 3/2006 | Nakamura ............ 375/371 |
| 2003/0061564 A1 * | 3/2003 | Maddux ............... 714/798 |

* cited by examiner

*Primary Examiner*—Mohammed Ghayour
*Assistant Examiner*—Freshteh Aghdam

(57) ABSTRACT

A method and circuit to produce an optimal sampling phase for recovery of a digital signal is achieved. A digital signal is over-sampled by sampling on each phase of a multiple phase clock to generate a sample value per phase. The multiple phase clock may be generated by a DLL. A voted value is determined per phase comprising a majority value of a set of consecutive sample values. Transition phases are sensed. A transition phase is defined as two consecutive voted phases comprising different values. The transition phases are compared to a stored phase state to determine a signal shift direction. The signal shift direction is filtered to generate a state update signal. The stored phase state is updated based on the state update signal. The stored phase state corresponds to an optimal sampling phase for recovery of the digital signal.

25 Claims, 7 Drawing Sheets

| $V_n$ | $V_{n+1}$ | T |
|---|---|---|
| 0 | 0 | 0 |
| 0 | 1 | 1 |
| 1 | 0 | 1 |
| 1 | 1 | 0 |

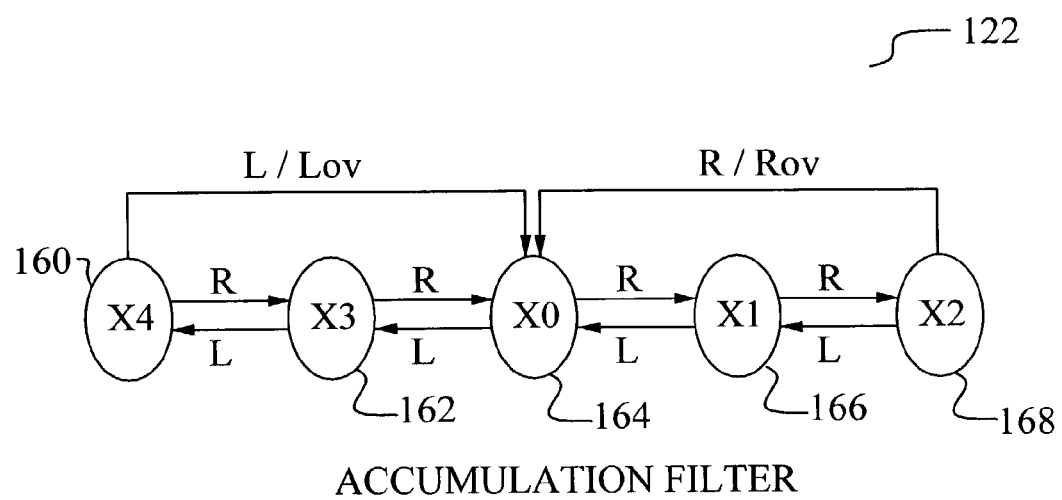
FIG. 9  ACCUMULATION FILTER
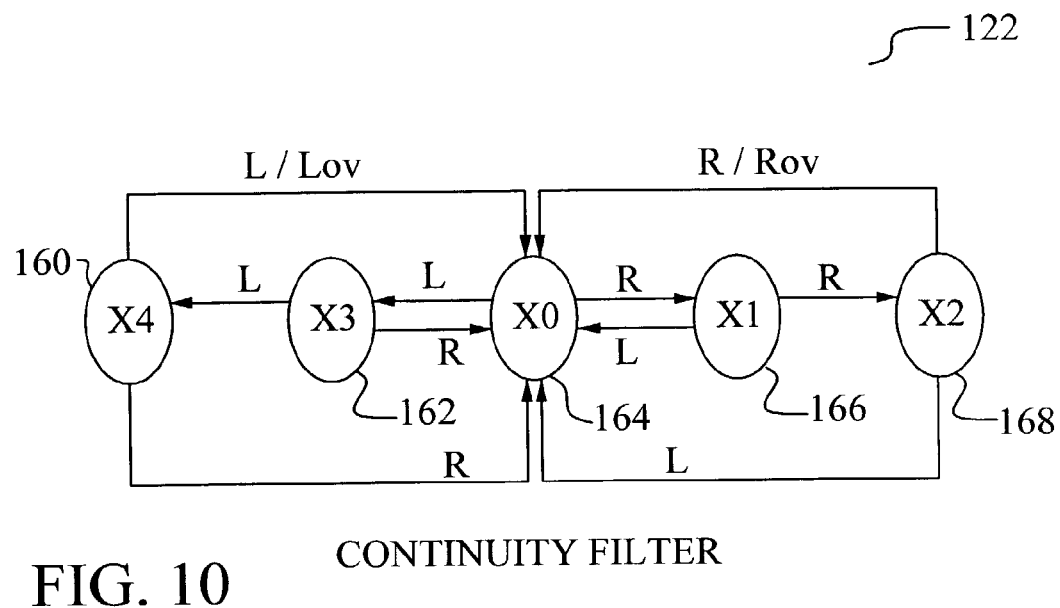
FIG. 10  CONTINUITY FILTER

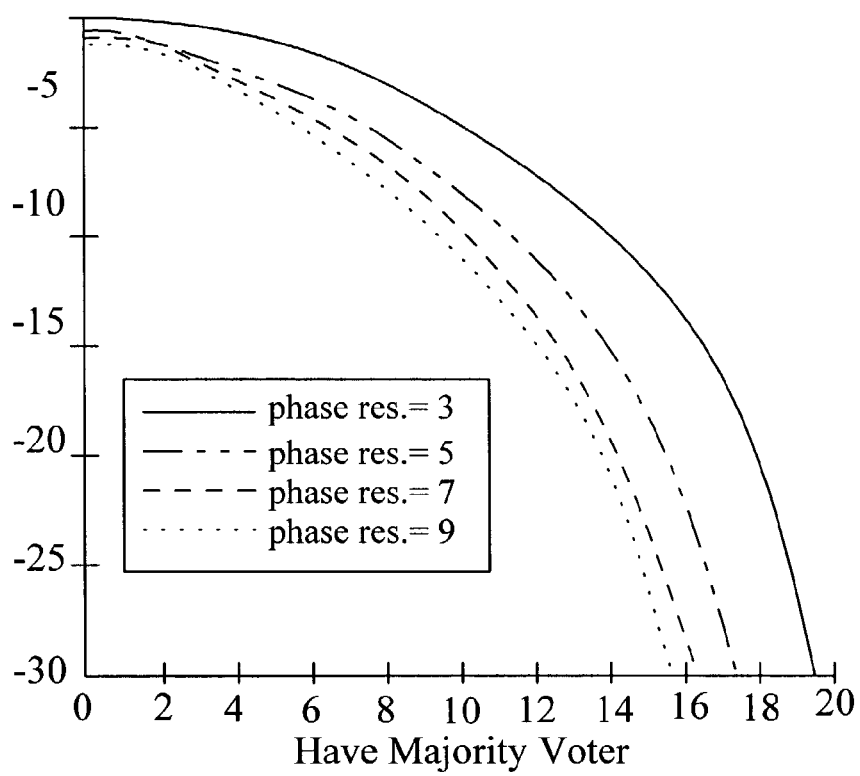
Have Majority Voter
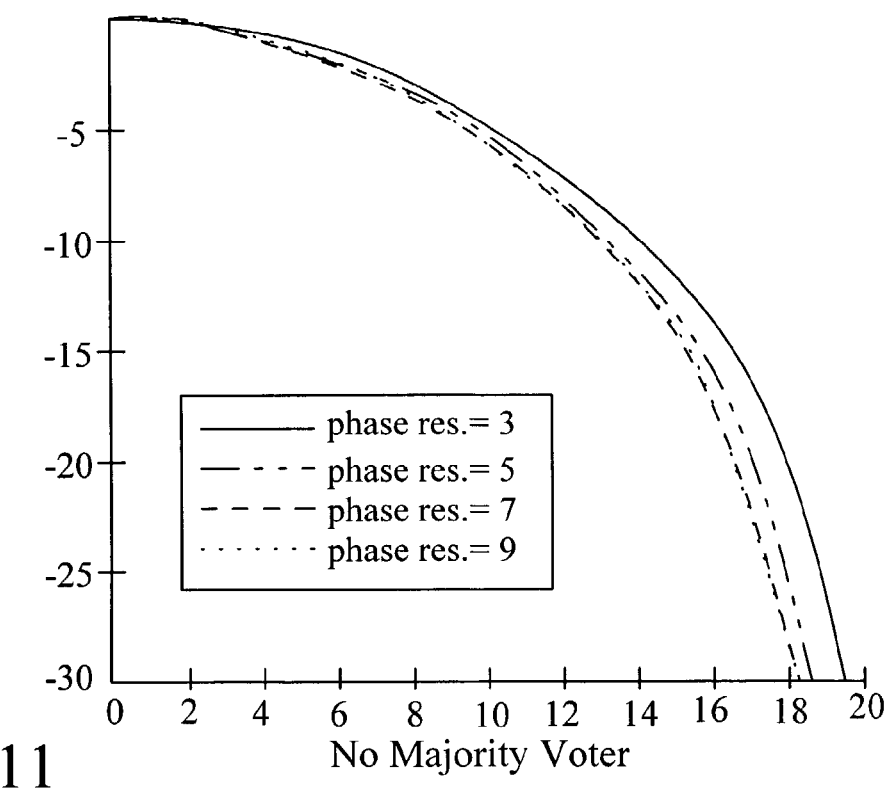
FIG. 11
No Majority Voter

SERIAL LINK SCHEME BASED ON DELAY LOCK LOOP

BACKGROUND OF THE INVENTION (1) Field of the Invention

The invention relates to digital signal processing and, more particularly, to a method and system to recover a digital signal by sampling at an optimal phase.

(2) Description of the Prior Art

The demand for higher bit rates by the communications industry has led to the development of high speed and low cost serial link technology. Applications, such as computer-to-computer or computer-to-peripheral interconnection, are requiring high bit rates for both short distances and long distances. However, as data rates increase, losses due to cables and parasitics limit the bandwidth of data links. Improvements in data reliability and bit error rate (BER) are needed.

Referring now to FIG. 1, a prior art digital communications system is shown. A first device, NODE 1 10, is coupled to a second device, NODE 2 14, by a transmission line 18. The first device 10 is sending a stream of digital data 22 out the DOUT pin. This data 22 is encoded as a series of high and low levels. The length of time that the signal is high or low determines whether a "0" value or a "1" value has been encoded. These time lengths are encoded using the first node oscillator OSC1 signal as a time reference.

The data signal 22 is received at the second node DIN pin 14. The second node 22 will decode the incoming signal by determining, first, whether the signal is in a high or low state. Then the length of time in the high/low state is measured to decode a "0" or a "1" value. The second node oscillator OSC2 signal is used as a time reference for decoding the received data. The successful reception and decoding of the digital data signal is called data recovery.

Successful reception of the transmitted signal 22 requires that every bit sent is received and decoded to the proper value. If, for example, a bit "0" is received and decoded improperly as a bit "1", then a bit error has occurred. The number of bit errors occurring over time is called the bit error rate (BER) of the system. Many factors can contribute to the BER of a digital system. A first problem is ambient noise 28 coupling onto the transmission line 18. Ambient noise sources 28, such as electromagnetic interfere (EMI) or wire-to-wire capacitive coupling, can cause momentary distortions in the data signal 22 waveform. These distortions cause the received waveform at the DIN pin to be decoded improperly.

A second problem is synchronization of the time references of the first and second nodes 10 and 14. In the ideal scenario, each node would use a common system clock reference. However, this is not normally possible. Therefore, as in this example, each node typically has an independent, free-running oscillator. Further, each oscillator, OSC1 and OSC2, is based on an independent crystal 24 and 26. Variations in manufacturing and in operating conditions will cause a frequency mismatch in OSC1 and OSC2. In addition, the periodic transitions of the two clocks will not be synchronized. Further, one clock may drift in frequency over time independently of the other clock.

To provide a means of clock synchronization, delay lock loops (DLL) or phase lock loops (PLL) have been applied in general to generate a synchronous base. The synchronous base is a clocking signal that is used to sample and decode the incoming data signal. The DLL or PLL circuits use a feedback scheme to generate a clocking frequency based on the frequency of the incoming data signal. The use of DLL and PLL provide for improved synchronization and frequency matching, but these approaches have limitation. It is found that noise 28 coupled onto the transmission channel 18 strongly reduces the signal-to-noise ratio (SNR) of the data transmitted. The combination of low SNR and non-ideal clocking effects due to the DLL or PLL frequently results in poor BER performance. This poor BER is especially found in applications near the bandwidth limits due to cable losses and parasitic effects.

Several prior art inventions relate to digital transmission, reception, and data recovery methods and devices. U.S. Pat. No. 6,229,859 to Jeong et al discloses a method and system for transmission and recovery of original digital data. The method includes over-sampling and a phase lock loop. U.S. Pat. No. 5,218,677 to Bono et al shows a computer system high speed link. U.S. Pat. No. 6,107,946 to Jeong et al discloses a system for high speed synchronization and data communications.

SUMMARY OF THE INVENTION

A principal object of the present invention is to provide an effective method for digital signal recovery.

A further object of the present invention is to provide a method for optimizing the DLL generated sampling phase used in data recovery for a digital signal.

A yet further object of the present invention is to improve sampled data confidence using a majority vote process for phase optimization.

Another yet further object of the present invention is to provide phase optimization using a confidence filter.

Another further object of the present invention is to reduce the bit error rate.

Another further object of the present invention is to provide a digital signal, recovery circuit having phase optimization to improve the bit error rate.

In accordance with the objects of this invention, a method to produce an optimal sampling phase for recovery of a digital signal is achieved. The method comprises over-sampling a digital signal on each phase of a multiple phase clock to generate a sample value per phase. A voted value is determined per phase comprising a majority value of a set of consecutive sample values. Transition phases are sensed. A transition phase is defined as two consecutive voted phases comprising different values. The transition phases are compared to a stored phase state to determine a signal shift direction. The signal shift direction is filtered to generate a state update signal. The stored phase state is updated based on the state update signal. The stored phase state corresponds to an optimal sampling phase for recovery of the digital signal.

Also in accordance with the objects of this invention, a digital signal recovery circuit is achieved. The circuit comprises, first, an over-sampling circuit for sampling a digital signal on each phase of a multiple phase clock to generate a sample value per phase. A voting circuit sets a voted value per phase comprising a majority value of a set of consecutive sample values. A transition phase sensor indicates a transition phase where two consecutive voted phases comprise different values. A phase shift state register stores a phase state corresponding to an optimal sampling phase. A means to compare transition phases to the stored phase state determines a signal shift direction. A signal shift direction filter filters the signal shift direction and thereby generates a state update signal that is further used to update the phase shift state register.

BRIEF DESCRIPTION OF THE DRAWINGS

In the accompanying drawings forming a material part of this description, there is shown:

FIG. 9 illustrates a first preferred embodiment of a confidence counter or signal shift, direction filter of the present invention.

FIG. 10 illustrates a second preferred embodiment of a confidence counter or signal shift, direction filter of the present invention.

FIG. 11 illustrates bit error rate (BER) simulations for the system of the present invention over several sampling resolutions with and without the majority voter feature.

DESCRIPTION OF THE PREFERRED EMBODIMENTS

The preferred embodiments of the present invention disclose a method to produce an optimal sampling phase for recovery of a digital signal. The method uses multi-phase sampling, majority voting, and signal transition filtering to select the optimal sampling phase. Preferred embodiments of a circuit for digital signal recovery are also disclosed. It should be clear to those experienced in the art that the present invention can be applied and extended without deviating from the scope of the present invention.

Figure 1:
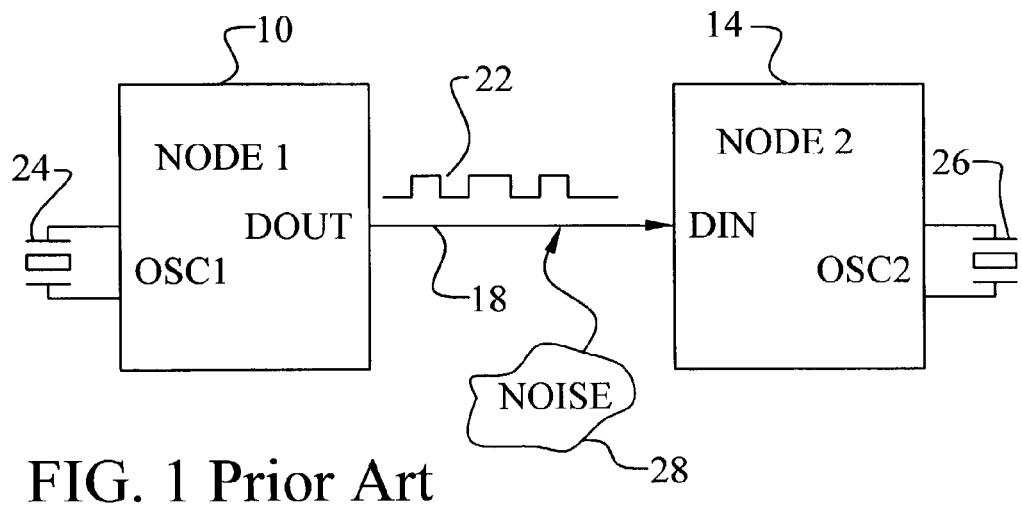
FIG. 1 illustrates a prior art system where digital data is transmitted and received.
Figure 2:
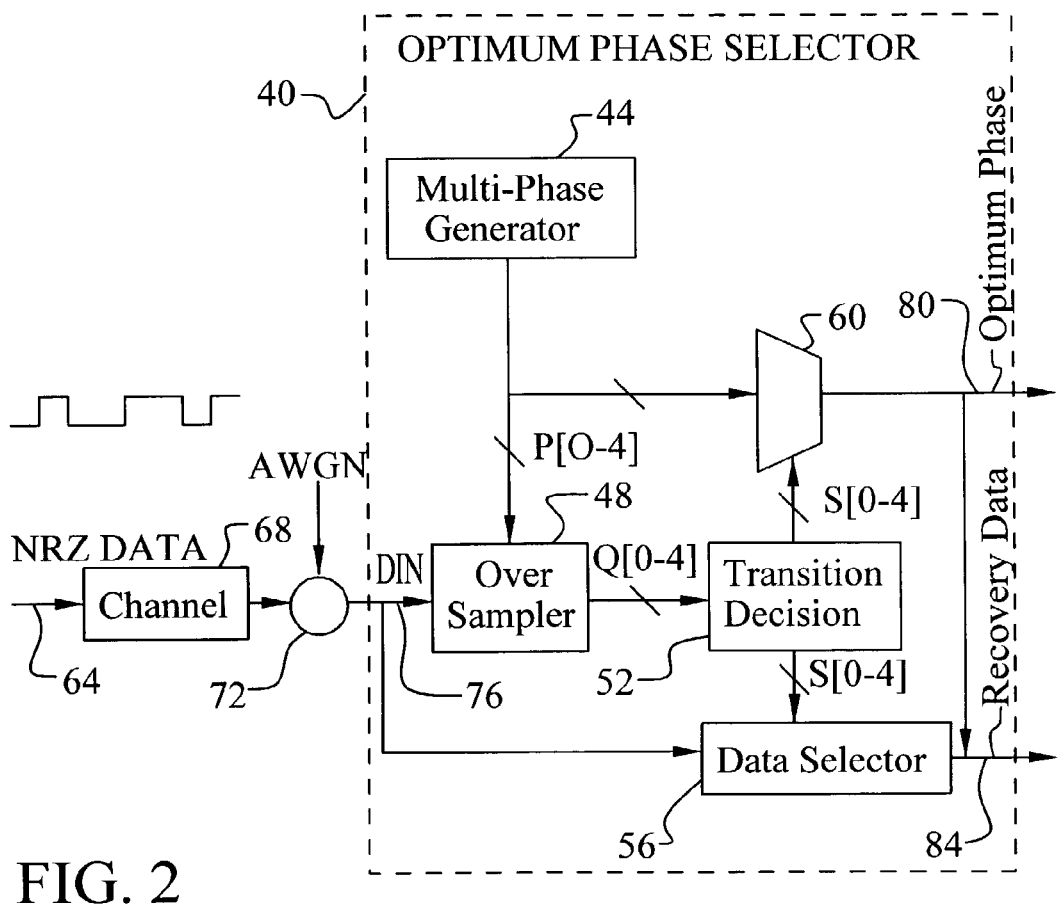
FIG. 2 illustrates the preferred embodiment of the digital data recovery circuit of the present invention.

Referring now to FIG. 2, a preferred embodiment of the present invention is illustrated. Several important features of the present invention are illustrated. The preferred architecture and method of data processing will be discussed below. A digital signal recovery circuit 40 for recovery of a digital signal 76 is shown. The digital signal, DIN 76, may comprise a data bit stream or a clocking signal. In the illustration, a non-return to zero (NZR) input signal 64 is shown. A NRZ signal transitions low/high on every data bit. The length in low/high state determines the encoded/decoded binary value. The data signal 64 is carried by the transmission channel 68. During transmission, noise may be added to the signal 64. As a modeling device, an additive white Gaussian noise (AWGN) signal is added to the data signal to create the data input 76 to the recovery circuit 40.

As a first important feature, the digital signal recovery circuit 40 comprises an over-sampling circuit 48. The over-sampling circuit 48 samples the digital signal 76 on each phase of a multiple phase clock P[0–4] to generate a sample value per phase Q[0–4]. To insure a low bit error rate (BER), the digital signal 76 must be sampled at a rate higher than the nominal bit rate. For example, the over-sampling circuit preferably comprises a sampling rate at least three times the nominal frequency of the digital signal. A multi-phase generator 44 is used to generate the multi-phase clock P[0–4]. In the preferred embodiment, the multi-phase clock P[0–4] comprises five phases of data sampling. Alternatively, other sampling phase resolutions could be used. The multi-phase generator preferably comprises a delay lock loop circuit to generate the multi-phase signal P[0–4] at a rate controlled by the data signal 76 nominal frequency. An over-sampled data value Q is generated for each sampling phase P such that a set of Q[0–4] corresponds to the sampled values of DIN 76 at each sample phase P[0–4].

Figure 3:
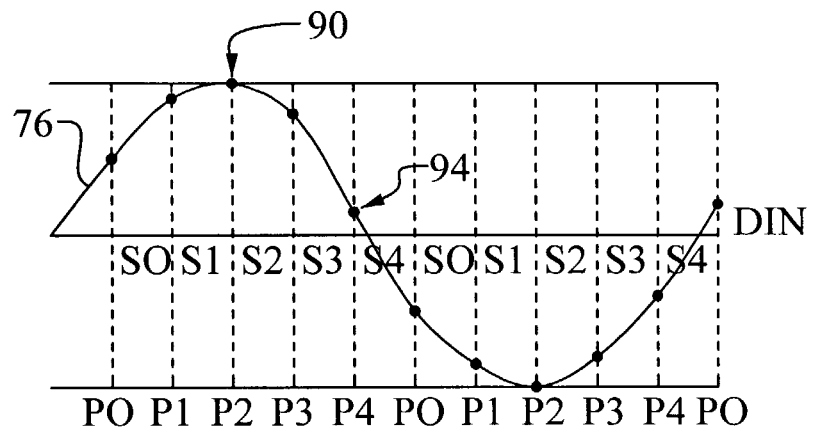
FIG. 3 illustrates over-sampling a signal using a multi-phase clock.

Referring now to FIG. 3, the over-sampling process is shown. The data input signal 76 is shown over a time period. The multi-phase clock P[0–4] is used to trigger sampling of DIN 76. At each phase, the value of DIN 76 is sampled and recorded as a low or high level. For example, the sample 90 at the P2 phase is a high level. Each phase P[0–4] is associated with a system state S[0–4]. For example, the system state is S0 when the transition occurred from the sample at P0 until the sample at P1. By sampling the input 76 at a rate substantially above the nominal frequency of the input 76, the present invention achieves a high resolution and improved synchronization.

Figure 4:
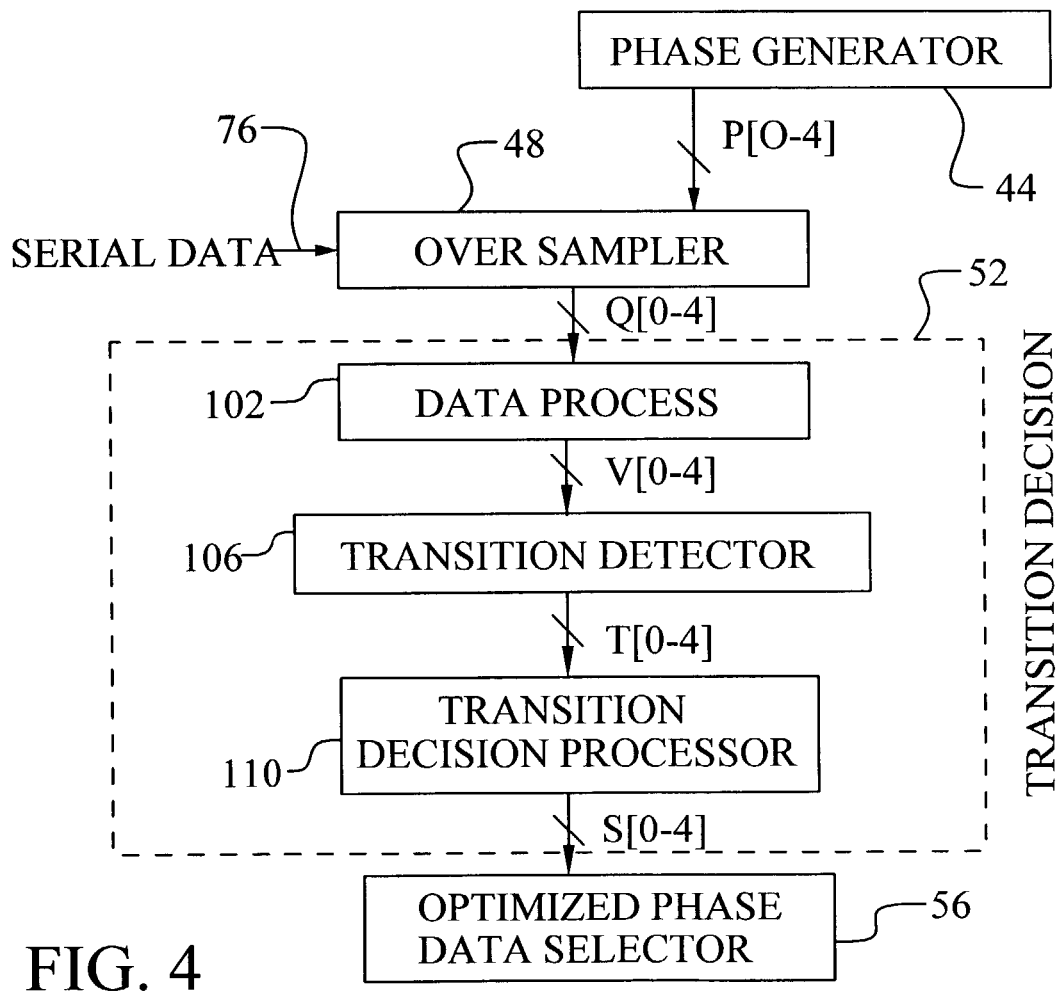
FIG. 4 illustrates the preferred embodiment signal processing method of the present invention.

Referring again to FIG. 2, as another important feature, a transition decision circuit 52 is used to further process the sample values Q[0–4]. The transition decision circuit 52 comprises a data process block, a transition detector block, and a transition decision processor as will be further described below. Referring now to FIG. 4, the data flow of the present invention is shown. The serial data 76 is over-sampled 48 using the multi-phase clock P[0–4] from the phase generator 44. A sample value per phase is generated to create the series Q[0–4]. The sampled values Q[0–4] are next processed through the data process block 102 of the transition decision circuit 52.

The data process block 102 comprises a voting circuit. The voting circuit generates a voted value per phase, or V. These voted values, V[0–4], comprise the majority value of a set of consecutive sample values from Q[0–4]. For example, assume that P1 is the current phase and that the sampled value $Q_1$ is '0'. Further, assume that the sampled value, $Q_0$, at P0 was '1' and that the sampled value, $Q_2$, at P2 was '0'. This means that the consecutive sample values Q[0–2] are [1, 0, 0]. In this case, the majority value of the set Q[0–2] is '0' because there are more '0' values than '1' values. Therefore, the majority voted value $V_1$ at P1 is determined to be '0'. In the preferred embodiment, the generic voted value, $V_n$, is based on three consecutive sample values Q[n−1:n+1] including the sample for the current phase. It is found that processing the sampled values V[0–4] through the majority vote data process 102 improves the reliability and the BER of data recovery. The majority voted values for a series of three sampled values are shown in Table 1 below.

TABLE 1

| Voted value ($V_{n-1}$) for a series of sampled values Q[n − 2:n] | | | |
|---|---|---|---|
| $Q_n$ | $Q_{n-1}$ | $Q_{n-2}$ | $V_{n-1}$ |
| 0 | 0 | 0 | 0 |
| 0 | 0 | 1 | 0 |

TABLE 1-continued

Voted value ($V_{n-1}$) for a series of sampled values Q[n − 2:n]

| $Q_n$ | $Q_{n-1}$ | $Q_{n-2}$ | $V_{n-1}$ |
|---|---|---|---|
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 5:
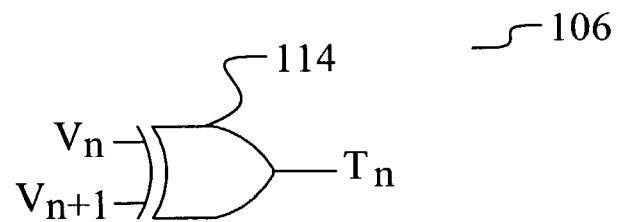
FIG. 5 illustrates the preferred embodiment transition detector of the present invention.

As another important feature, the transition detector block 106 is used to determine when the input signal 76 transitions from a low to a high level or from a high to a low level. For example, in FIG. 3, the input signal DIN 76 transitions 94 from a high to a low level between P4 and P0. Referring again to FIG. 4, the transition detector or phase sensor 106 detects a transition phase where two consecutive voted phases, $V_n$ and $V_{n-1}$, comprise different values. Referring now to FIG. 5, a preferred embodiment of the transition phase sensor 106 is shown as an XOR function 114. The XOR function 114 detects a 0,1 or a 1,0 sequence in the voted data V(n−1:n). The transition value $T_n$ is set when a transition is detected.

Referring again to FIG. 4, the transition decision processor 110 is used to update and to store the optimal sampling phase state for recovering the digital data. Referring again to FIG. 3, note that each period is divided into N regions corresponding to the N sampling phases. In this case N equals five. To determine where the signal transition from high/low or low/high occurs, each bit period is divided into 5 regions corresponding to the 5 sampling phases. Therefore, the five sampling phases P[0–4] have five corresponding states S[0–4]. If, for example, the transition occurs between the P4 and P0 phases, as shown, then the transition state is S4. The optimal sampling phase is a constant offset from the transition state. In this case the optimal sampling phase is the P2 phase 90. The purpose of the transition decision processor is to determine and to update a stored transition state based on the detected transition phase, the previously stored transition state, and a unique noise filtering method.

Figure 6:
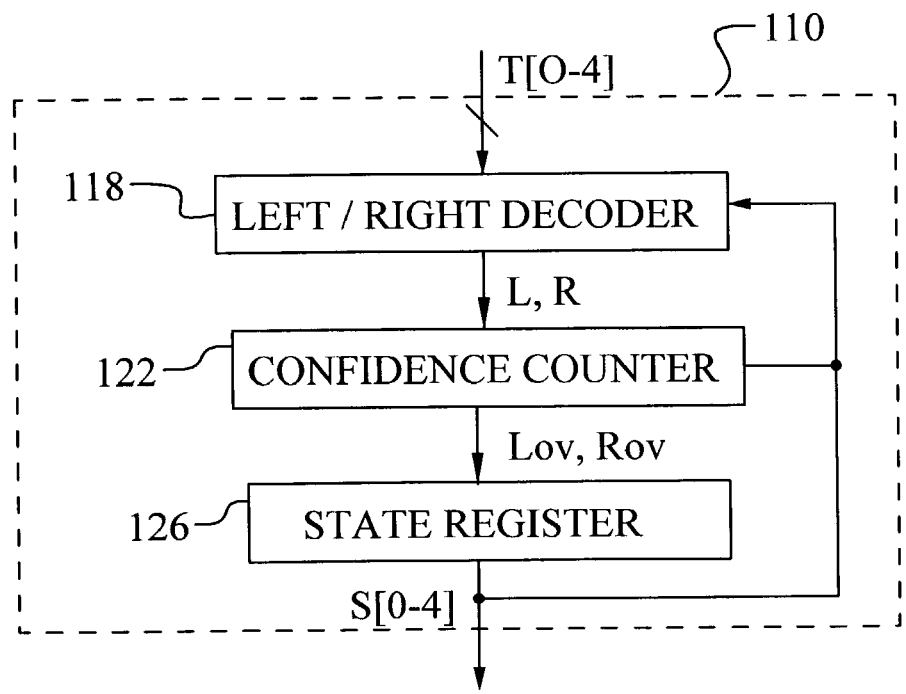
FIG. 6 illustrates the preferred embodiment of the transition decision processor method of the present invention.

Referring now to FIG. 6, the preferred embodiment of the transition decision processor 110 is shown. As a first important feature, a means to compare 118 the transition phases T[0–4] and to determine a L/R signal shift direction is used. This left/right decoder 118 compares the stored transition phase state to the detected transition state T[0–4]. If the detected transition state is the same as the stored phase state, then the recovery circuit is in an optimal sampling phase with respect to the current incoming signal. However, if the transition state $T_n$ of T[0–4] does not equal the stored phase state, then the input signal 76 and the sampling phase are no longer optimally synchronized.

Figure 8:
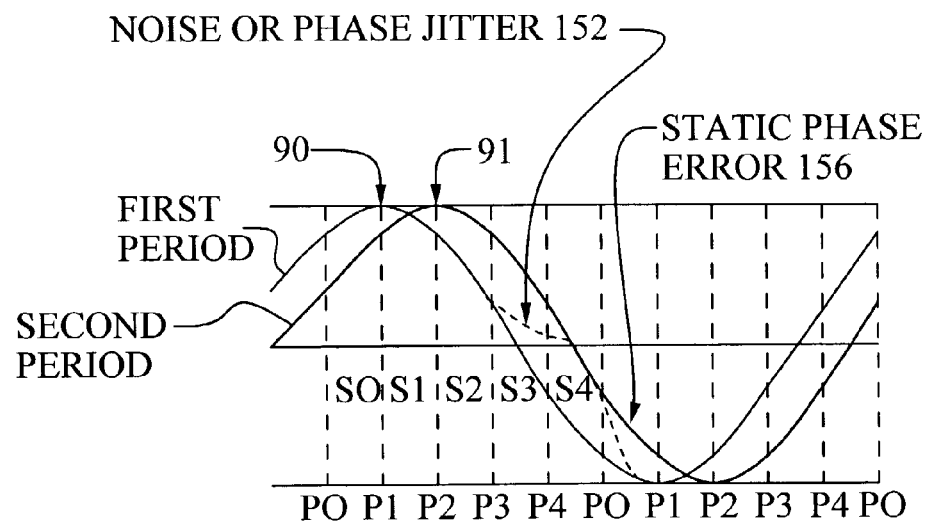
FIG. 8 illustrates the effect of noise and of phase error on a digital signal during an over-sampling process.

Referring now to FIG. 8, two possible reasons for a de-synchronization are shown. During a FIRST PERIOD, the input signal is shown transitioning from high to low between phase P3 and phase P4. Assuming that this has been the typical transition phase, then the recovery circuit of the present invention will set the stored phase state to the S3 state. The optimal sampling phase for the data signal is a constant offset from the stored state S3 and would be the phase P1 90. At a later, SECOND PERIOD, the input signal transitions from high to low between the phase P4 and phase P0. Therefore, a transition shift has occurred. The left/right decoder block 118 will compare the stored phase state, S3, with the detected transition phase, T4, and will indicated that a transition shift to the RIGHT has occurred.

It is important to note that the transition shift may occur for one of two reasons. First, a static phase error 156 may have occurred. A static phase error 156 occurs because the transmitting circuit, frequency base is offset from the receiving multi-phase clock due. This offset can occur due for many reasons. Further, this offset may be a non-constant value caused by drift in the transmitting frequency base over operating conditions. Second, a noise error or phase jitter error 152 may have occurred. The presence of noise in the signal channel may cause transition shifts in the received data signal 76.

It is found that the static phase error 156 changes relatively slowly while the noise error is random and temporary. As an important feature of the present invention, the transition decision circuit 110 is designed to respond to static phase errors and to update the optimal phase state. The recovery circuit is thereby optimally synchronized to the incoming data signal 76. However, the present invention is also designed to distinguish and to ignore noise errors 152. Therefore, the circuit does not alter the optimal sampling phase in response to random noise.

Referring again to FIG. 6, the L/R signal shift direction that is generated by the left/right decoder is next processed through a confidence counter 122. The confidence counter 122 is a signal shift, direction filter designed to filter out noise errors while still detecting static errors. Two types of confidence counters 122 may be used. Referring now to FIG. 9, the first type of confidence counter 122 comprises an accumulation filter. A group of state registers 160, 162, 164, 166, and 168, are used. In this case, a five-state counter is used. The counter is initialized to X0 164. The L/R signal shift direction from the left/right decoder block 118 is used to update the count. Right counts cause a rotate right while left counts cause a rotate left. $R_{OV}$ and $L_{OV}$ are the overflow indicators for the counter. When $R_{OV}$ or $L_{OV}$ occur, then the phase state, shift register 126 is updated. In this accumulation filter embodiment, the confidence counter 122 will generate a $R_{OV}$ or a $L_{OV}$ on the accumulation of three right shifts or of three left shifts. For example, a sequence of detected transition shifts comprising: Left, Left, Right, Left, Left will cause a $L_{OV}$ to occur because the net, accumulated shift is 4 Lefts−1 Right=3 Lefts.

Referring now to FIG. 10, a second embodiment of the confidence counter 122 is shown. In this embodiment, a continuity filter is implemented. Again, the shift register is initialized to X0 164. In this case, the confidence counter 122 requires a series of detected shifts all in the same direction to cause an overflow. For example, the detected transition shift sequence of Left, Left, Right, Left, Left does not cause an overflow because the single Right shift causes the shift register to reset from X4 to X0. A continuous sequence of Right, Right, Right or of Left, Left, Left is required.

Figure 7:
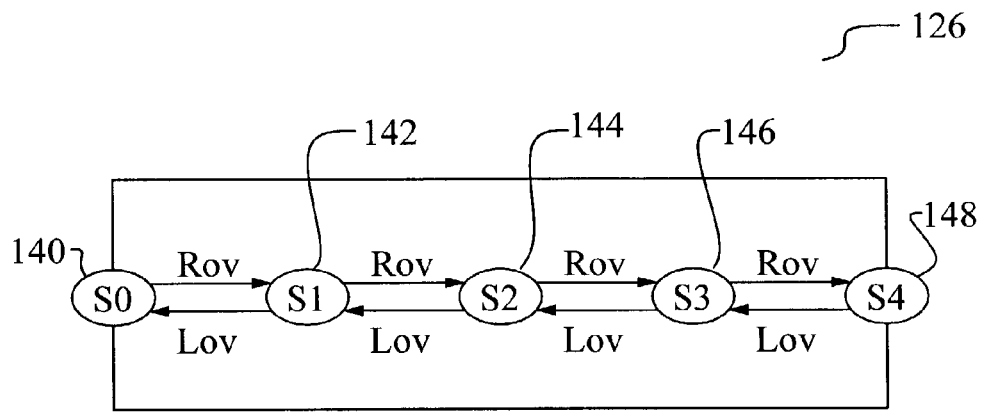
FIG. 7 illustrates a preferred embodiment of a phase state register of the present invention.

Referring now to FIG. 7, the preferred embodiment of the phase state, shift register 126 is shown. The phase state, shift register 126 preferably comprises a one hot-state, up/down counter. The counter 126 comprises N states corresponding to the N sampling phases. In this case, the counter 126 comprises five registers S0 140, S1 142, S2 144, S3 146, and S4 148. The rotation signals, $R_{OV}$ or $L_{OV}$, from the confidence counter 122 are used to shift the phase state. As described above, the phase state S[0–4] corresponds to the optimal sampling phase for recovery of the digital data.

Referring again to FIG. 2, the phase state S[0–4] of the transition decision circuit 52 is used by the optimum phase selector 60 to select the optimum phase 80 for data recovery. The optimum phase 80 is used by the data selector block 56 to sample the input data DIN 76 and to thereby generate the recovery data signal 84.

Simulation results prove the usefulness of the unique data recovery method of the present invention. Referring now to FIG. 11, bit error rate (BER) simulations are performed on the system of the present invention. The simulations are performed for a system with and without the majority vote method. In each case, the resolution of the sampling is simulated over a range of 3 to 9 samples per bit period. Without the majority vote method, the BER curves merge for sampling resolutions above five. In other words, increasing the sampling rate beyond five does not improve the BER. However, with the addition of the majority vote method for determining the voted sample state, the BER can be significantly improved by increasing the sampling resolution beyond five. It is found that the BER can be improved by about 2 dB through the use of majority voting in the optimal phase method of the present invention.

Figure 12:
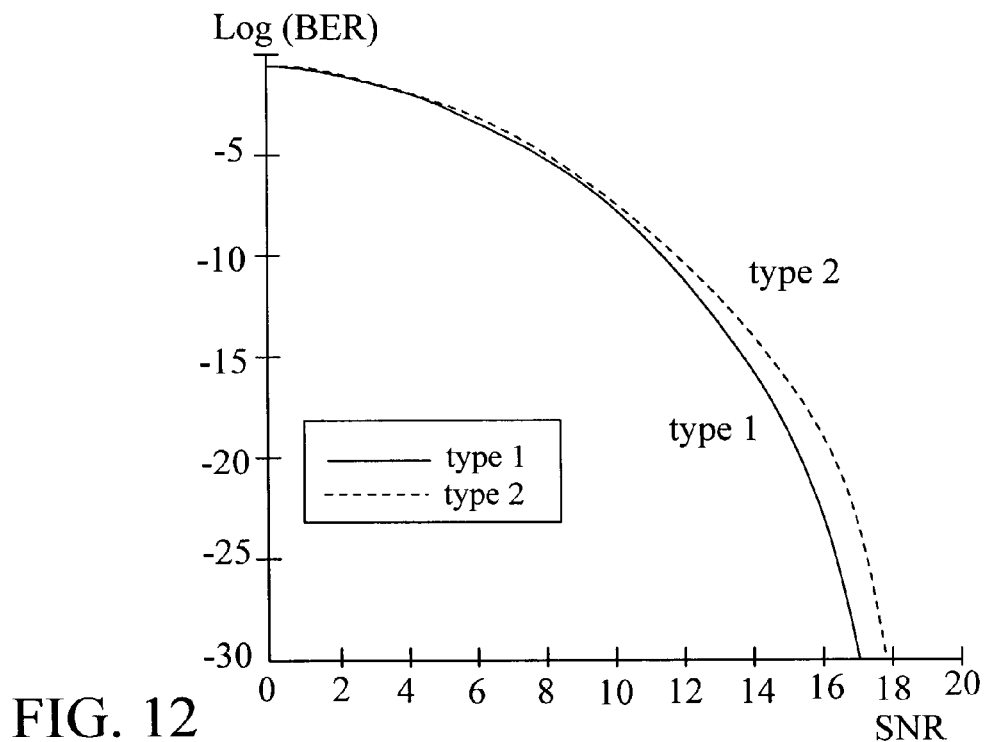
FIG. 12 illustrates BER versus the signal-to-noise ratio (SNR) simulations for the system of the present invention using the signal shift direction, confidence filters of accumulation type (type 1) or of continuity type (type 2).
Figure 13:
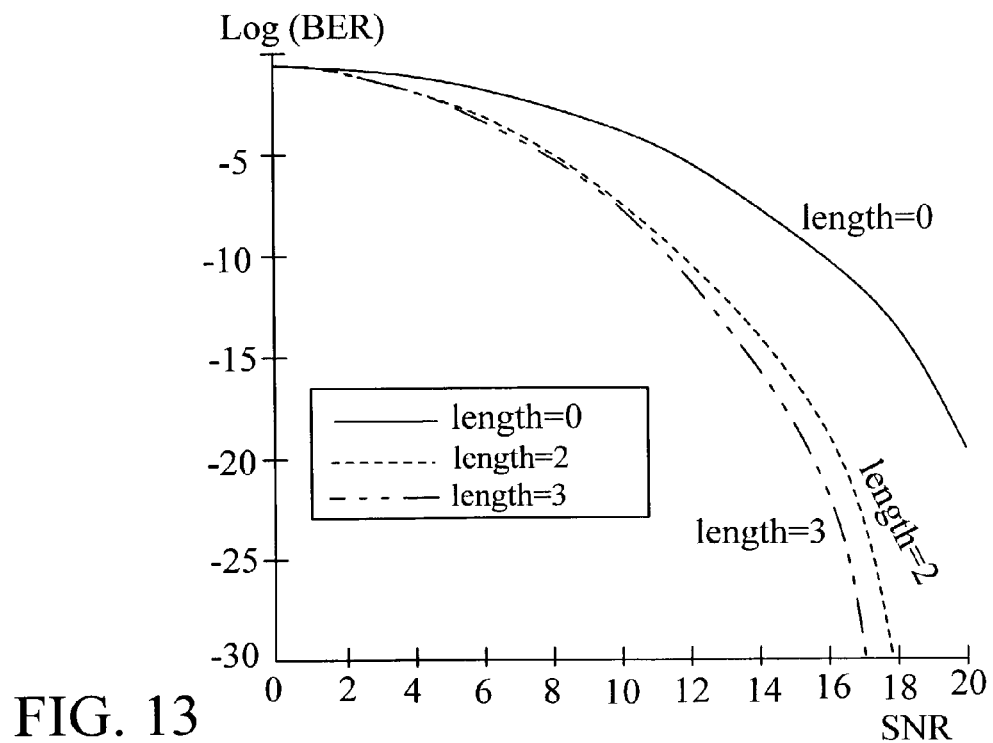
FIG. 13 illustrates BER versus SNR simulations for confidence filters of differing lengths of an embodiment of the present invention.

Referring now to FIG. 12, the BER performance is shown for the two types of confidence counters. It can be seen that the type 1, accumulative filter, performs somewhat better than the type 2, continuity filter. Referring now to FIG. 13, the effect on BER of varying the length of the confidence counter for one embodiment of the invention is shown.

The advantages of the present invention may now be summarized. An effective method and circuit for digital signal recovery is achieved. The method provides an optimized sampling phase for used in data recovery of a digital signal. The sampled data confidence is further improved using a majority vote process and a confidence filter for phase optimization. The invention reduces the bit error rate of recovered digital signals.

As shown in the preferred embodiments, the novel method and circuit of the present invention provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to produce an optimal sampling phase for recovery of a digital signal comprising:
    over-sampling a digital signal on each phase of a multiple phase clock to generate a sample value per said phase;
    setting a voted value per said phase comprising a majority value of a set of consecutive said sample values;
    sensing transition phases wherein two consecutive said voted phases comprise different values;
    comparing said transition phases to a stored phase state to determine a signal shift direction;
    filtering said signal shift direction to generate a state update signal; and
    updating said stored phase state based on said state update signal wherein said stored phase state corresponds to an optimal sampling phase for recovery of said digital signal.

2. The method according to claim 1 wherein said multiple phase clock is generated by a delay lock loop circuit.

3. The method according to claim 1 wherein said over-sampling comprises a sampling rate at least three times the nominal frequency of said digital signal.

4. The method according to claim 1 wherein said set of consecutive said sample values comprises at least three said sample values including said sample value for current said phase.

5. The method according to claim 1 wherein said step of sensing transition phases comprises processing said two consecutive voted values through an exclusive-OR (XOR) function.

6. The method according to claim 1 wherein said step of updating said stored phase state comprises counting an up/down counter based on said state update signal.

7. The method according to claim 1 wherein said step of filtering said signal shift direction comprises counting an up/down counter based on said signal shift direction and wherein said state update signal comprises an overflow/underflow of said up/down counter.

8. The method according to claim 7 wherein said overflow/underflow of said up/down counter occurs on an accumulation of a fixed number of same said signal shift directions.

9. The method according to claim 7 wherein said overflow/underflow of said up/down counter occurs on any continuity of a fixed number of same said signal shift directions.

10. A method to recover a digital signal using an optimal sampling phase comprising:
    over-sampling a digital signal on each phase of a multiple phase clock to generate a sample value per said phase;
    setting a voted value per said phase comprising a majority value of a set of consecutive said sample values comprising at least three said sample values including said sample value for current said phase;
    sensing transition phases wherein two consecutive said voted phases comprise different values;
    comparing said transition phases to a stored phase state to determine a signal shift direction;
    filtering said signal shift direction to generate a state update signal wherein said filtering comprises counting an up/down counter based on said signal shift direction and wherein said state update signal comprises an overflow/underflow of said up/down counter;
    updating said stored phase state based on said state update signal; and
    selecting said sample value at an optimal sampling phase to thereby recover said digital signal wherein said optimal sampling phase corresponds to said stored phase state.

11. The method according to claim 10 wherein said multiple phase clock is generated by a delay lock loop circuit.

12. The method according to claim 10 wherein said over-sampling comprises a sampling rate at least three times the nominal frequency of said digital signal.

13. The method according to claim 10 wherein said step of sensing transition phases comprises processing said two consecutive voted values through an exclusive-OR (XOR) function.

14. The method according to claim 10 wherein said step of updating said stored phase state comprises counting an up/down counter based on said state update signal.

15. The method according to claim 10 wherein said overflow/underflow of said up/down counter occurs on an accumulation of a fixed number of same said signal shift directions.

16. The method according to claim 10 wherein said overflow/underflow of said up/down counter occurs on any continuity of a fixed number of same said signal shift directions.

17. A digital signal recovery circuit comprising:
an over-sampling circuit for sampling a digital signal on each phase of a multiple phase clock to generate a sample value per said phase;
a voting circuit for setting a voted value per said phase comprising a majority value of a set of consecutive said sample values;
a transition phase sensor for indicating a transition phase where two consecutive said voted phases comprise different values;
a phase shift state register for storing a phase state corresponding to an optimal sampling phase;
a means to compare transition phases to said stored phase state to determine a signal shift direction; and
a signal shift direction filter to filter said signal shift direction and to thereby generate a state update signal that is further used to update said phase shift state register.

18. The circuit according to claim 17 wherein said multiple phase clock is generated by a delay lock loop circuit.

19. The circuit according to claim 17 wherein said over-sampling comprises a sampling rate at least three times the nominal frequency of said digital signal.

20. The circuit according to claim 17 wherein said set of consecutive said sample values comprises at least three said sample values including said sample value for current said phase.

21. The circuit according to claim 17 wherein said transition phase sensor comprises an exclusive-OR (XOR) function.

22. The circuit according to claim 17 wherein said phase state register comprises an up/down counter.

23. The circuit according to claim 17 wherein said signal shift direction filter comprises an up/down counter that is updated based on said signal shift direction and wherein said state update signal comprises an overflow/underflow of said up/down counter.

24. The circuit according to claim 23 wherein said overflow/underflow of said up/down counter occurs on an accumulation of a fixed number of same said signal shift directions.

25. The circuit according to claim 23 wherein said overflow/underflow of said up/down counter occurs on any continuity of a fixed number of same said signal shift directions.

* * * * *